(12) United States Patent
Tang et al.

(10) Patent No.: US 12,536,332 B2
(45) Date of Patent: Jan. 27, 2026

(54) METHOD, DEVICE AND NON-TRANSITORY COMPUTER-READABLE STORAGE MEDIUM FOR VIDEO ENCRYPTION AND ENCRYPTION KEY HIDING

(71) Applicant: Nanning FuLian FuGui Precision Industrial Co., Ltd., Nanning (CN)

(72) Inventors: Qiu-Yan Tang, Nanning (CN); Bing Tan, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 93 days.

(21) Appl. No.: 18/744,755

(22) Filed: Jun. 17, 2024

(65) Prior Publication Data

US 2025/0238548 A1 Jul. 24, 2025

(30) Foreign Application Priority Data

Jan. 23, 2024 (CN) .......................... 202410095103.4

(51) Int. Cl.
*G06F 21/00* (2013.01)
*G06F 21/16* (2013.01)
*G06F 21/62* (2013.01)
*G06T 7/20* (2017.01)

(52) U.S. Cl.
CPC .......... *G06F 21/6254* (2013.01); *G06F 21/16* (2013.01); *G06T 7/20* (2013.01); *G06T 2207/30196* (2013.01)

(58) Field of Classification Search
CPC .............................. G06F 21/6254; G06F 21/16
See application file for complete search history.

(56) References Cited

U.S. PATENT DOCUMENTS

| | | | | |
|---|---|---|---|---|
| 11,006,077 B1* | 5/2021 | Truong | ...................... | H04N 7/15 |
| 2018/0144754 A1* | 5/2018 | Peng | ................... | H04N 21/8358 |
| 2022/0345790 A1* | 10/2022 | Engi | ....................... | H04N 7/147 |
| 2022/0353467 A1* | 11/2022 | Truong | ................. | H04W 12/02 |

FOREIGN PATENT DOCUMENTS

| | | | |
|---|---|---|---|
| CN | 103491384 B | 1/2017 | |
| CN | 113989090 A | 1/2022 | |
| CN | 114422830 B | 7/2022 | |

OTHER PUBLICATIONS

Rabieh et al., "Privacy-Preserving and Efficient Sharing of Drone Videos in Public Safety Scenarios using Proxy Re-encryption," 2020 IEEE 21st International Conference on Information Reuse and Integration for Data Science (IRI), Las Vegas, NV, USA,, p. 45-52 (Year: 2020).*

* cited by examiner

*Primary Examiner* — Morshed Mehedi
(74) *Attorney, Agent, or Firm* — ScienBiziP, P.C.

(57) ABSTRACT

A method, a device and a non-transitory computer-readable storage medium for video encryption and encryption key hiding, the method first detecting whether a captured video frame contains sensitive information, and if the video frame is detected to contain sensitive information, encrypting the region containing the sensitive information and embedding the encryption key in the video frame, and simultaneously embedding the position information of the embedded encryption key in the audio data as a watermark.

10 Claims, 5 Drawing Sheets

METHOD, DEVICE AND NON-TRANSITORY COMPUTER-READABLE STORAGE MEDIUM FOR VIDEO ENCRYPTION AND ENCRYPTION KEY HIDING

FIELD

A method, device and non-transitory computer-readable storage medium for video encryption and encryption key hiding.

BACKGROUND

With the widespread application of audio and video technology, home video surveillance has become normalized, bringing convenience and worry at the same time to consumers. However, if the surveillance device is hacked, the privacy of individuals in the video will be exposed to the network.

The prior art proposes to encrypt a video file by forming a key with randomly generated 128 as a binary number and storing the key in the video file, the advantage is that the key is randomly generated, the disadvantage is that the key is stored directly in the packet header part of the video, which is easy to crack.

BRIEF DESCRIPTION OF THE DRAWINGS

Implementations of the present technology will now be described, by way of example only, with reference to the attached figures, wherein.

DETAILED DESCRIPTION

It should be understood that the detailed description and specific examples, while indicating exemplary embodiments, are intended for purposes of illustration only and are not intended to limit the scope of the claims.

Figure 1:
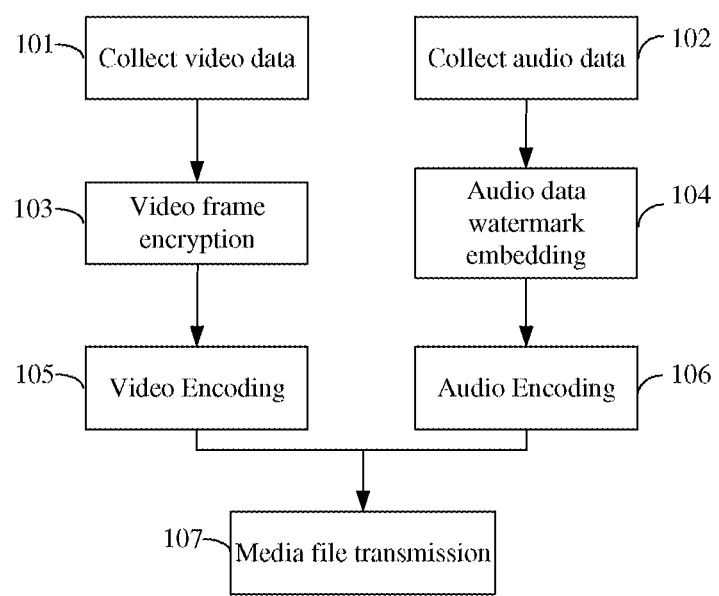
FIG. 1 is a schematic diagram of an audio-video acquisition process with video encryption and encryption key hiding according to one embodiment of the present disclosure.

FIG. 1 is a schematic diagram of an audio-video acquisition process with video encryption and encryption key hiding. The audio-video acquisition process can be applied to electronic devices such as mobile phones, tablet computers, desktop computers, and servers. The electronic device includes a video capture device for capturing video data and an audio capture device for capturing audio data.

It is understood that the electronic device may be presented in different product types in different embodiments.

In one embodiment, the video capture device and the audio capture device may be integrated into the electronic device. In different embodiments, the video capture device and the audio capture device may be independent of the electronic device and may communicate with the video electronic device in a wired or wireless manner.

Block 101 and block 102 collect video data and audio data, respectively, via the video capture device and the audio capture device, wherein the video data includes a plurality of video frames and the audio data includes a plurality of audio frames. The video frames and the audio frames use the same clock source that can be used for audio and video synchronization operation.

Block 103, using a timestamp of the video frame as a random seed, calculating to generate an encryption key, and using the encryption key to encrypt a sensitive area of the video frame, and embedding the encryption key in the video frame, wherein the sensitive area is an area containing a moving object. After encrypting the video frame, the encryption key embedding information is converted into a binary bit rate as watermark information.

Block 104, the watermark information is embedded in the audio data.

Block 105 and Block 106, respectively, encode the video frame queue and the audio frame queue.

Block 107, the encoded video packet queue and the audio packet queue are encapsulated according to standard rules to generate a media file for transmission.

The electronic device may transmit the media file to the receiving end via network transmission. The receiving end, after receiving the media file and completing demultiplexing and decoding, extracts the watermark information to obtain the original audio frame, and obtains the encryption key embedding position information based on the watermark information to obtain the encryption key, and decrypts the corresponding video frame to obtain the original video frame.

Figure 2:
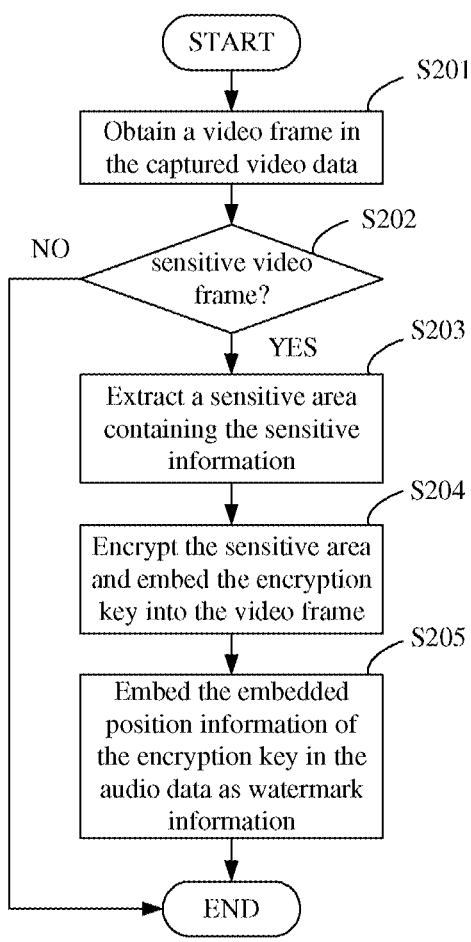
FIG. 2 is a flow chart of a video encryption and encryption key hiding method according to one embodiment of the present disclosure.

FIG. 2 is a flow chart of a video encryption and encryption key hiding method of one embodiment of block 103 and block 104 of FIG. 1. Various steps in the flow of the method are described below.

Step S201, obtaining a video frame in the captured video data.

Step S202, detecting whether the video frame is a sensitive video frame containing sensitive information. If so, execution of step S203 continues.

In step S203, a sensitive area containing the sensitive information is extracted from the video frame.

Specifically, the sensitive information is a moving object. In one example, the moving object is a human body.

In one example, the sensitive information is detected and recognized using a three-frame difference method for the video frame, and the sensitive area is extracted based on the position and contour of the sensitive information in the video frame.

Specifically, the three-frame difference method is used to differ the video frame from the previous and next neighboring frames, respectively, and then the difference results of each of the other frames are summed and calculated to obtain the position and contour of the moving object in the video frame. On the basis of the contour of the moving object obtained from the inter-frame differencing, a morphological corrosion operation is performed on the differenced binarized image to eliminate the fine noise in the frame image; and then an expansion operation is performed to fill the cracks and voids in the contour of the moving object. According to the contour of the moving object, a total of four point positions in the contour, the highest point position, the lowest point position, the leftmost point position and the rightmost point position, are obtained, and a regular rectangular region is extracted according to these four point positions, which is the sensitive area.

In another embodiment, a sensitive video frame can also be determined using a background difference method. Specifically, the previous frame is taken as a background image and it is judged whether there is an outline of a moving object in the difference image obtained after differentiating the previous frame from the video frame. If there is, the video frame is determined to be a sensitive video frame. If not, it is further determined whether the previous frame is a sensitive video frame, and if so, the similarity between this video frame and the previous frame is compared. If the similarity between the video frame and the previous frame is greater than a preset threshold, the video frame is designated as a sensitive video frame and the sensitive area is set to be the same as the sensitive area of the previous frame.

Step S204, generating an encryption key for encrypting the sensitive area based on the timestamp of the video frame, and embedding the encryption key in the same video frame or another video frame.

In an embodiment, a globally unique identifier (GUID) may be generated based on the timestamp of the video frame, a device serial number, and a MAC address of the pre-registered receiving end, and the globally unique identifier is formed with a random code to form the encryption key.

In one embodiment, before embedding the encryption key into the video frame, the encryption key may also be converted into a dimensional QR code image and segmented, and each sub-QR code image after segmentation may be embedded into the video frame.

For example, GUID=b6915568-bbc7-8fcb-b69b-9e1e8d4793f4, the random code is 104C11DB7, and the full encryption key after the combination is b6915568bbc78fcbb69b9e1e8d4793f4104C11DB7. The full encryption key is converted into a QR code image. Take the example of a 2D code image, minimum pixel size 21×21, size 441 ppi, total 3528 bits (441×8). When divided into 6 equal parts, each part is 588 bits. Taking the common resolution of video 1080P60 as an example, there are 60 frames per second, and the pixel points of each frame are 1920×1080=2073600, totaling 16588800 bits (2073600×8), and the embedding rate of each equal part in the video frame is only 3.544560185185185e-5 (588/16588800). The advantage of encoding the encryption key as a QR code is that, in addition to the higher security of the QR code data, the QR code image has an error correction function so that even if part of the QR code image is missing during transmission, the receiving end can eventually recognize the complete data and obtain a reliable encryption key.

In one embodiment, an area other than a sensitive area in a video frame is selected as an embedded area of the encryption key. In different embodiments, a non-sensitive video frame may also be selected as the embedded video frame of the encryption key.

Specifically, the region where the encryption key is embedded in the video is selected based on the human eye's sensitivity to brightness and chroma. Research has shown that the human eye is less sensitive to colors that are highly saturated, that is, pure colors, such as red, black, or white. Therefore, the video frame to be embedded is converted from RGB color space to HSV color space to obtain the information of hue H, saturation S, and brightness V. The frame image of the video frame to be embedded is then converted to HSV color space. The frame image of the video frame to be embedded is binarized according to the hue information, and the contour is calculated after morphological corrosion operations are performed on the binarized image to obtain an embedding region in which the encryption key can be embedded.

In one embodiment, after selecting the embedding area of the encryption key, the pixel value of the embedding area is converted to binary, and the encryption key is embedded into the lowest valid bit of the pixel value of the embedding region by the LSB (Least Significant Bit) algorithm. Since the color difference cannot be detected by the human eye by changing the pixel value of the lowest bit, the encryption key can be well hidden from information. After the encryption key is embedded in the video frame, the embedding position information of the encryption key is recorded at the same time. For example, after the encryption key is coded as a two-dimensional code and divided into four encryption key segments to be embedded in a video frame numbered U, the embedding position information of the encryption key can be obtained as A (X1, Y1), B (X2, Y2), C (X3, Y3), D (X4, Y4) and the frame number U.

Step S205, the embedded position information of the encryption key is converted into a binary bit sequence to be used as watermark information, and the watermark information is scrambled and embedded in the audio data.

In one embodiment, a discrete cosine transform (DCT) domain audio information hiding algorithm is used to embed the watermark information.

Specifically, a discrete cosine transform is performed on an audio sampling point of an audio frame, and the low and mid frequency coefficients of the discrete cosine transform are adaptively quantized to embed the watermark information, and the discrete cosine transform coefficients are inverted after the respective adaptive quantization and embedding of the watermark information to produce an audio signal containing the watermark information.

Figure 3:
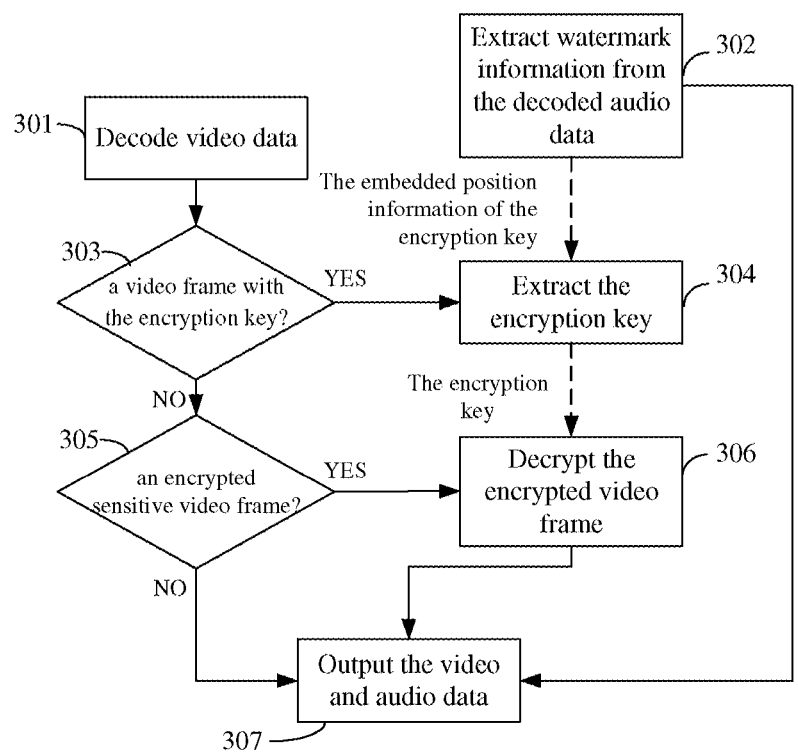
FIG. 3 is a schematic block diagram of an audio-video processing flow according to one embodiment of the present disclosure.

FIG. 3 is a flow chart of an audio-video processing flow at a receiving end of one embodiment after receiving a media file is shown.

Block 301, the video data is decoded into a plurality of video frames.

Block 302, the watermark information is extracted after audio decoding to obtain the embedded position information of the encryption key.

Block 303, determining, according to the embedded position information of the encryption key, whether the current video frame is a video frame with an encryption key. If the current video frame is determined to be a video frame with the encryption key, the block 304 is executed; if the current video frame is determined not to be a video frame with the encryption key, the block 305 is continued.

Block 304, using a reverse algorithm, extracts the encryption key from the encryption key video frame based on the embedded position information of the encryption key obtained by the block 302.

Block 305, determining whether the current video frame is an encrypted sensitive video frame. If the current video frame is determined to be an encrypted sensitive video frame, block 306 is executed; if the current video frame is determined not to be an encrypted sensitive video frame, block 307 is executed.

Block 306, decrypts and restores the sensitive video frame according to the encryption key obtained from block 304.

Block 307, reduces the decrypted audio and video data to an emulated signal and outputs it to an output device. In an example, the output device is a monitor and a speaker.

Figure 4:
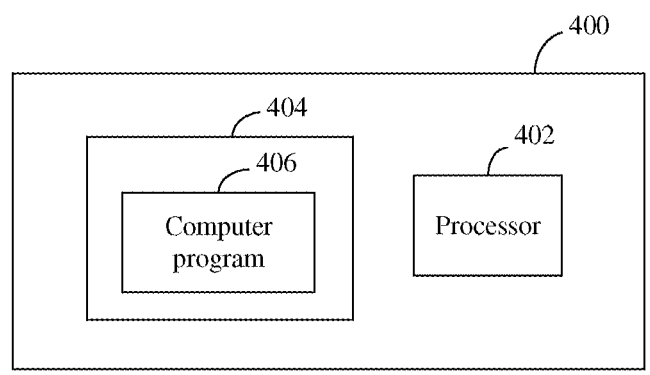
FIG. 4 is a block diagram of a device for video encryption with key concealment according to one embodiment of the present disclosure.

FIG. 4 is a block diagram of a device 400 for video encryption and key hiding. The device 400 includes a processor 402, a memory 404, and a computer program 406.

The device 400 is an electronic device. It should be appreciated by those skilled in the art that the composition of the device 400 shown in FIG. 4 is not a limitation of the embodiments of the present invention, and that the device 400 shown in FIG. 4 is simplified for purposes of description, and in different embodiments may comprise a composition of fewer or more parts than shown.

In one embodiment, the processor 402 may comprise integrated circuits, e.g., it may comprise a single packaged integrated circuit, or it may comprise a plurality of integrated circuits packaged for the same function or for different functions, including one or more central processing units (CPUs), microprocessors, digital processing chips, graphics processors, and a combination of various control chips, and so on. The processor 402 is the control core (control unit) of the device 400, which uses various interfaces and circuits to connect various components of the entire device 400, to perform various functions of the device 400, and to process data by running or executing the computer program 406 or module stored in the memory 404, and by retrieving the data stored in the memory 404, such as video encryption and key hiding methods.

In one embodiment, the memory 404 is used to store the code of a computer program 406 and various data, such as a video encryption and key hiding method, and to enable fast, automatic completion of accessing the program or data during operation of the device 400. The memory 404 includes read-only memory (ROM), programmable read-only memory (PROM), erasable programmable read-only memory (EPROM, one-time programmable read-only memory (OTPROM), electrically erasable programmable read-only memory (EEPROM), compact disc read-only memory (CDR), and read-only memory (ROM). (EEPROM), Compact Disc Read-Only Memory (CD-ROM) or other optical disk memory, magnetic disk memory, magnetic tape memory, or any other computer-readable storage medium that can be used to carry or store data.

Figure 5:
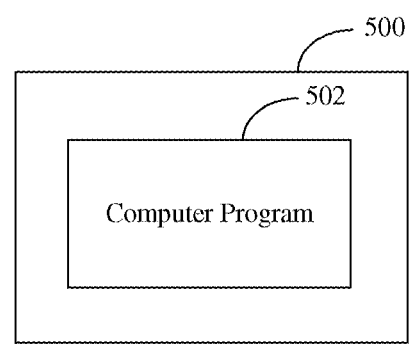
FIG. 5 is a block diagram of a non-transitory computer-readable storage medium for video encryption with key concealment according to one embodiment of the present disclosure.

FIG. 5 is a block diagram of a non-transitory computer-readable storage medium 500 for video encryption and key hiding. As shown in FIG. 5, the computer-readable storage medium 500 stores a computer program 502 that, when executed by a processor, implements the video encryption and key hiding method.

In summary, the video encryption and key hiding method and apparatus of the present invention well protects the information to be hidden by encrypting sensitive areas at the audio and video recording end and hiding the encryption key in the video for transmission so that the receiver is unable to recover sensitive video frames containing sensitive areas without a reversible algorithm.

It will be apparent to those skilled in the art that various modifications and variations can be made to the disclosure without departing from the scope or spirit of the claims. In view of the foregoing, it is intended that the present disclosure covers modifications and variations, provided they fall within the scope of the following claims and their equivalents.

What is claimed is:

1. A method for video encryption and encryption key hiding, the method is applied on an electronic device, the method comprising:
    obtaining a video frame in captured video data;
    determining whether the video frame is a sensitive video frame containing sensitive information;
    extracting a sensitive area containing the sensitive information when the video frame is determined as a sensitive video frame containing sensitive information;
    generating an encryption key based on a timestamp of the video frame, using the encryption key to encrypt the sensitive area;
    embedding the encryption key in the video frame and recording embedding position information of the encryption key; and
    converting the embedding position information into watermark information, and embedding the watermark information in recorded audio data.

2. The method of claim 1, wherein the video frame is determined as a sensitive video frame when the video frame containing a moving object.

3. The method of claim 2, wherein the video frame is determine to contain a moving object when a human body is detected in the video frame.

4. The method of claim 2, wherein the determining whether the video frame is a sensitive video frame containing sensitive information further comprises further comprises:
    determining the sensitive information in the video frame using a three-frame difference method.

5. The method of claim 2 further comprising:
    obtaining a total of four point positions of a highest point position, a lowest point position, a leftmost point position, and a rightmost point position in a contour of the moving object based on the contour of the moving object; and
    extracting a rectangular area from the video frame as the sensitive area based on the four point positions.

6. The method of claim 1, wherein the generating an encryption key based on a timestamp of the video frame comprises:
    generating a globally unique identifier based on the timestamp of the video frame, a device serial number, and a MAC address of a pre-registered receiver; and
    forming the encryption key from the globally unique identifier and a random code.

7. The method of claim 1, wherein the embedding the encryption key in the video frame comprises:
    converting the encryption key into a dimensional QR code image and segmenting the dimensional QR code image; and
    embedding each one of segmented sub-dimensional QR code images in the video frame.

8. The method of claim 1, wherein the embedding the encryption key in the video frame comprises:
    selecting an area other than the sensitive area as a embedding area of the encryption key.

9. A device configured for video encryption and encryption key hiding, the device comprising:
    a memory storing processor-executable instructions; and
    at least one processor coupled to the memory to receive the processor-executable instructions, wherein, upon execution of the processor executable instructions, the at least one processor:
    obtaining a video frame in captured video data;
    determining whether the video frame is a sensitive video frame containing sensitive information;
    extracting a sensitive area containing the sensitive information when the video frame is determined as a sensitive video frame containing sensitive information;
    generating an encryption key based on a timestamp of the video frame, using the encryption key to encrypt the sensitive area;
    embedding the encryption key in the video frame and recording embedding position information of the encryption key; and converting the embedding position information into watermark information, and embedding the watermark information in recorded audio data.

10. A non-transitory computer readable storage medium storing processor-executable instructions which, when executed by at least one processor, cause the at least one processor to perform a method for video encryption and encryption key hiding, the method comprising:

obtaining a video frame in captured video data;

determining whether the video frame is a sensitive video frame containing sensitive information;

extracting a sensitive area containing the sensitive information when the video frame is determined as a sensitive video frame containing sensitive information;

generating an encryption key based on a timestamp of the video frame, using the encryption key to encrypt the sensitive area;

embedding the encryption key in the video frame and recording embedding position information of the encryption key; and converting the embedding position information into watermark information, and embedding the watermark information in recorded audio data.

\* \* \* \* \*